United States Patent [19]

Hummel et al.

[11] 4,308,528

[45] Dec. 29, 1981

[54] ELECTROMECHANICALLY DRIVEN DIGITAL INDICATING DEVICE

[75] Inventors: Dietmar Hummel; Felix Müller, both of Schwenningen, Fed. Rep. of Germany

[73] Assignee: Kienzle Apparate GmbH, Villingen, Fed. Rep. of Germany

[21] Appl. No.: 107,460

[22] Filed: Dec. 26, 1979

[30] Foreign Application Priority Data

Dec. 28, 1978 [DE] Fed. Rep. of Germany ....... 2856447

Apr. 28, 1979 [DE] Fed. Rep. of Germany ....... 2917392

[51] Int. Cl.$^3$ ........................ G06K 15/00; G08B 5/36; G09F 9/00

[52] U.S. Cl. ........................................ 340/373; 40/449; 340/378.2; 340/764

[58] Field of Search .................. 116/200; 40/450, 447, 40/449, 451; 340/764, 376, 373, 378.2

[56] References Cited

U.S. PATENT DOCUMENTS

| | | | |
|---|---|---|---|
| 3,991,496 | 11/1976 | Helwig et al. | 40/449 |
| 4,024,532 | 5/1977 | Sherwin | 340/764 |
| 4,115,936 | 9/1978 | Nidelkoff | 116/200 X |
| 4,152,853 | 5/1979 | Lewis | 40/451 |
| 4,161,832 | 7/1979 | Bergamini | 40/449 |

FOREIGN PATENT DOCUMENTS

| | | | |
|---|---|---|---|
| 2200469 | 8/1972 | Fed. Rep. of Germany | 340/764 |
| 2448633 | 10/1974 | Fed. Rep. of Germany | 340/764 |
| 2804153 | 8/1978 | Fed. Rep. of Germany | 340/764 |

*Primary Examiner*—Daniel M. Yasich

*Attorney, Agent, or Firm*—Toren, McGeady & Stanger

[57] ABSTRACT

An electromechanically driven digital indicating device comprising an arrangement of seven flaps electromagnetically movable to one of two defined positions. The flaps are disposed in a housing at one plane thereof so as to form an "8"-shaped figure. The device includes a deep drawn parallelopiped housing having a front window opening in the form of a parallelogram and having a plate with an elevated, freely accessible "8"-shaped contour constructed integrally with the housing. The plate is supported only at connecting rods at the rear of the housing in internal sides walls of the housing. On the reverse side of the bar-shaped contour, there are provided grooves into which bearing bolts of the flap elements are pivotally inserted.

6 Claims, 13 Drawing Figures

ELECTROMECHANICALLY DRIVEN DIGITAL INDICATING DEVICE

BACKGROUND OF THE INVENTION

1. Field of the Invention

The invention relates to an electromechanically driven digital indicating device comprising an arrangement of seven flaps electromagnetically movable to two defined positions. The flaps are disposed in a housing at one plane thereof so as to form an "8"-shaped figure. The device includes driving electromagnets to move the flaps so that, by actuation of certain combinations of flaps, digits are to be represented.

2. Background of the Prior Art

Generally speaking, digital indicating devices which are electromagnetically driven have a design wherein all figures from "0" to "9" may be represented in a matrix of seven bars or segments in the form of a stylized "8". In a simple known embodiment of this kind of digital indicating means (German Offenlegungsschrift No. 22 00 469), there is an indicating panel arranged at the front side in which there is a system of gaps provided for the digits to be indicated. Behind each gap, an electromagnetically actuatable segment is arranged which may be moved to an indicating or non-indicating position. To accentuate the indicating part of the segment, this part of the segment is provided with a coloring which contrasts against the surface of the panel.

In the non-indicating position of the segment, it closes the gap and is of the same color as the surface of the panel so that at a certain distance, the closed gaps of the system are visually hardly perceivable. By simultaneously moving a combination of at least two up to maximally all seven segments to the indicating position, all the digital symbols from "0" to "9" may be represented. The electromagnetic devices for moving the segments consist of magnetic coils with an iron core so that a magnetic field is built up when the coil is energized. Depending on the direction of the magnetic field, a permanent magnet connected to the segment is attracted or rejected. This means that the rotatably mounted segment is moved between an indicating and a non-indicating position.

Another embodiment of the above described electromagnetic indicating devices has become known through Offenlegungsschrift No. 24 48 633. This indicating device consists of a front window plate which, for making visible the indicating elements, has seven longitudinal openings, the openings being arranged a certain distance from each other but in the shape of an "8". In a plane behind the front window plate, there is a bearing plate mounted at a certain distance on cylindrical elements. The plate serves to pivotally mount the seven indicating elements. The indicating elements are arranged so that they may be moved from one stable position, where they are invisible behind the front window plate, to another angular stable position where the indicating elements, which are in a contrasting color with respect to their surroundings, appear in the opening behind the front window plate. Accordingly, when the elements are read in connection, they represent a symbol of a figure. For mounting the indicating elements, the mounting plate is provided with a plurality of flanges which extend forwardly to the front window plate. In another plane behind the bearing plate, that is, in a third plane, there is a back plate which is borne by two distance pieces by the bearing plate. The back plate serves to position and to fasten the seven magnetic cores which extend forwardly to the bearing plate. The front window plate, the bearing plate and the back plate are screw-connected via rod-shaped distance pieces and bushings in a firm position to each other.

The known electromechanical indicating devices are disadvantageous especially because, for making one decade of figures, a relatively large number of parts is required. The position of the parts with respect to each other depends on a lot of tolerances, particularly since the cooperating parts are arranged in three planes. This means that a high degree of attention and care is required to produce the parts as well as to mount them to a complete indicating device for one digit. If it is required to protect the movable parts and especially the very sensitive bearing parts against dirt, there is no other choice but to include the whole construction within an external housing.

With the known solution, it is also disadvantageous that the position of the pivotal magnets with respect to the magnetic field of the coil cores is not optimal. Since the pairs of mounting flanges extend forwardly to the front window plane, there unavoidably are, between the permanent magnets of the flaps and the electromagnets pertaining thereto, wide air gaps. The efficiency of the magnetic circle is therefore very small because of the big air gap which the magnetic force has to overcome. This means that, for moving the segments, current pulses of considerable strength are required which cannot be taken directly from an electronic driving circuit without using additional amplifying circuits. This, however, means rather increased production costs. Due to the lower efficiency of the magnetic path and since the indicating means are not protected against dirt, it is not possible to achieve short switching times. This, of course, unfavorably influences the expenses which have to be made with respect to the electronic parts for producing the control pulses (one decoder required only).

With regard to the aesthetic impression of the number representation with respect to its readability, the known digital indicating device is not an optimal solution since the number is produced by pivoting the colored segments or bars into the window attributed thereto. It is unavoidable that, at the transition between two segments, there will be gaps which are perceived as an unwelcome interruption in the figure line.

In another known digital indicating device as described by German Offenlegungsschrift No. 28 04 153, an attempt is made not to represent the figures by individually pivotal segments but in the form of an uninterrupted line. Here, it shall be possible to use also an internal light source. In this solution, the electromechanically actuatable segments are moved off to realize partially or wholly the "8"-shaped figure arranged thereunder. Of course, in this arrangement, the seven slots in the cover plate of the housing form a single uninterrupted eight-shaped window which allows the release also of an "8"-shaped figure under the cover plate. The pivotal covering segments arranged to release the figure especially at the two sides of the figure running from top to bottom are, however, symmetrically arranged and, in the range of the median bar, interrupt the line of the figure "8". For each figure to be indicated, in which of the two lateral segments only one is to be moved to the uncovering position, in the range of transition of the median bar into the lateral bars, essential parts of the figure remain covered. The figure forming line is thereby partially interrupted. This essentially worsens the readability of the corresponding figure representations, that means of the 2, 4, 5, 6 and 9, and gives the impression of an incomplete representation of the figure.

SUMMARY OF THE INVENTION

It is a primary object of the invention to design an electromechanically driven digital indicating device on the basis of a 7-segment-indication such that it consists of as few parts as possible which may be composed of a simple mounting process and which, by a suitable arrangement and shape of the parts, possesses a high functional quality so that the lines of the number representations to be shown are interrupted as little as possible.

According to the invention, this object is achieved in that the indicating device consists of a deep drawn parallelepiped housing having a front window opening at its front side in the form of a parallelogram and bearing a plate with an elevated, freely accessible, "8"-shaped contour made in one piece with the housing and supported only at connected rods at the rear in the internal side walls of the housing and wherein, on the reverse side of the bar-shaped contour, there are provided grooves into which the bearing bolts of the flap elements are pivotally inserted.

For a better understanding of the present invention, reference is made to the following description and accompanying drawings, while the scope of the present invention will be pointed out in the appended claims.

DESCRIPTION OF THE PREFERRED EMBODIMENTS

Figure 1:
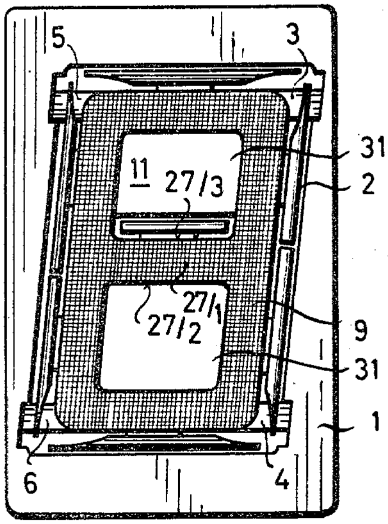
FIG. 1 is a complete digital indicating device with all flaps in uncovering position to indicate the figure "8"

The digital indicating device according to the invention consists of a parallelepiped, deep-drawn housing 1 with a window opening 2 at the front side in the form of a parallelogram (FIGS. 1, 1A, 2, 6). In the window opening 2, there is a plate 11 which is freely accessible from all sides and forming one piece with the housing 1. The plate is connected only by connecting rods 3, 4, 5 and 6 (FIGS. 3, 5) at the rear to the internal side walls 7, 8. The plate 11 is provided with an "8"-shaped elevated contour 9, 10. By "contour" reference is made to a continuous connected area which has an "8"-shaped outline. At the reverse side of the plate 11, in the elevated contour, there are grooves 12, 13, 14, 15, 16, 17 and 18 into which flap elements 21, 22, 23, 24, 25, 26, 27 may be pivotally inserted by means of bearing bolts 19, 20 provided thereon.

Figure 7:
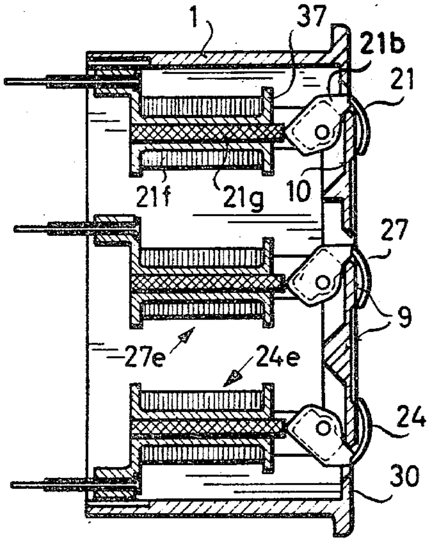
FIG. 7 illustrates a cut through the digital indicating device with completely pivoted flap elements.
Figure 6:
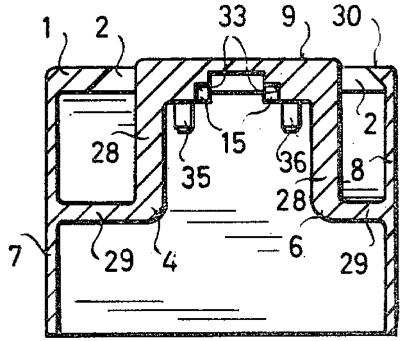
FIG. 6 shows a cut through the housing according to FIG. 5.

In order to make the housing 1 in one piece with the plate 11 carrying the figure symbol, the connecting rods 3, 4, 5, 6 between the plate 11 and the housing 1 are designed to be posts fastened at the corners of the reverse side of the contour and extending vertically to the rear of the housing, which finally terminates as lateral connections 29 at the side walls 7 and 8 as carrier elements. The elevated "8"-shaped contour 9 projects at the front side above the plane of the plate 11 and thereby also projects above the plane of the front frame 30 of the housing 1 and the covering plate 31 for plate 11 for generally covering the window opening 2. This may be seen from FIGS. 6 and 7. Due to the "8"-shaped contour 9 projecting above all parts of the housing 1, the plane of the figure may be covered with a corresponding dye in a simple surface printing process. A continuous connected area representing a stylized "8" is produced from which, by covering individual parts thereof, all other figure symbols from "0" to "9" may be represented also in an uninterrupted line representation. The contrasting color of the uncovered figure line in connection with the contour 9 projecting from the plane of the housing 1 visually gives the indicated symbol a sharp and well readable appearance.

Figure 1A:
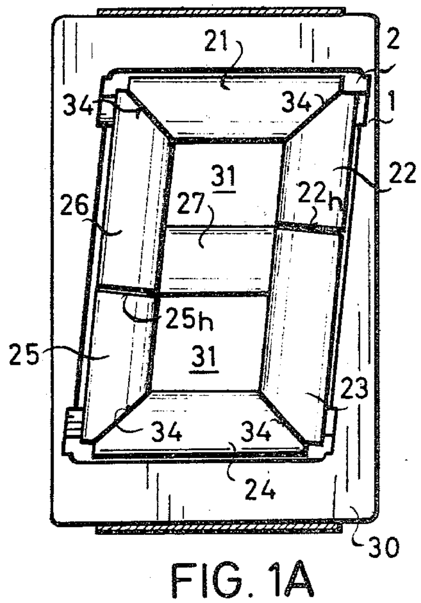
FIG. 1A illustrates the digital indicating device according to FIG. 1, with all flaps in position to completely cover the whole figure contour.

As may be seen from FIG. 1, when all flap elements 21 to 27 are moved to the uncovering position, the figure "8" is shown. The flap elements 21 to 27 are preferably made of the same material as the housing 1 so that they are corresponding in color to the front frame 30 and to the covering plane 31 so that, when all flap elements 21 to 27 are moved to the covering position, the contour 9 is completely covered so that even at a slight distance, the outlines of the seven flaps 21 to 27 used to cover the symbol representing contour 9 according to FIG. 1A are no longer perceivable.

Figure 2:
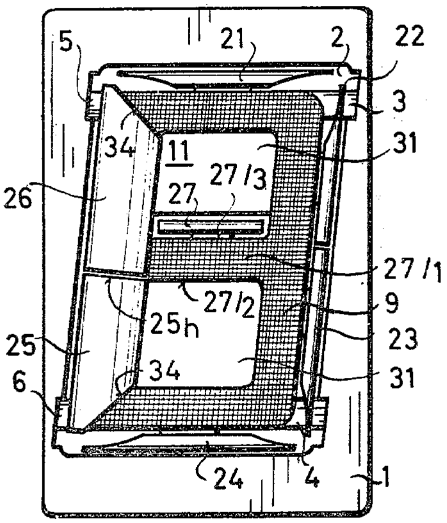
FIG. 2 illustrates the digital indicating device with flaps pivoted into a visual position to cover the left side bar; the other flaps being in uncovering position to indicate the figure "3"
Figure 2A:
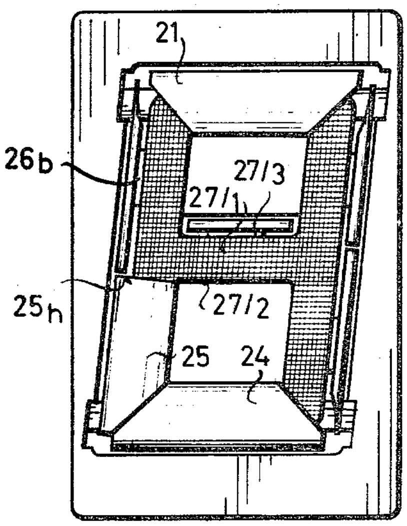
FIGS. 2A to 2D show the digital indicating device with flaps correspondingly moved to covering and uncovering positions to represent the figures "4", "5", "6" and "9"
Figure 2B:
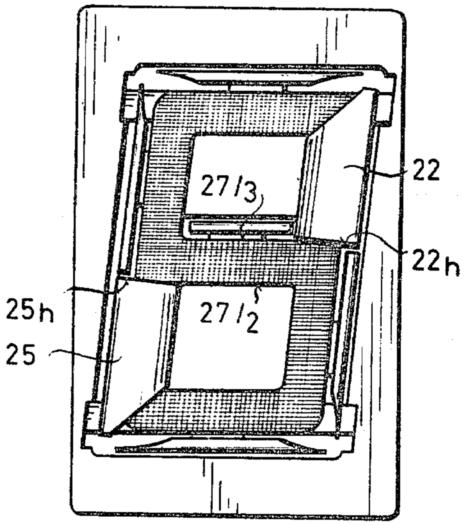
Figure 2C:
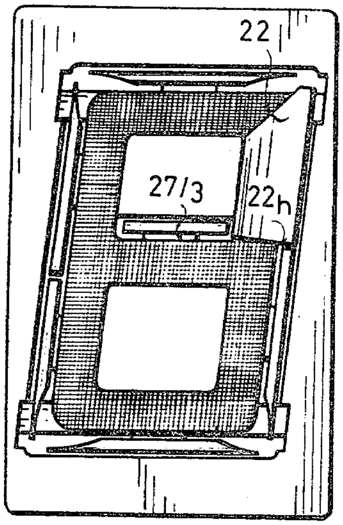
Figure 4:
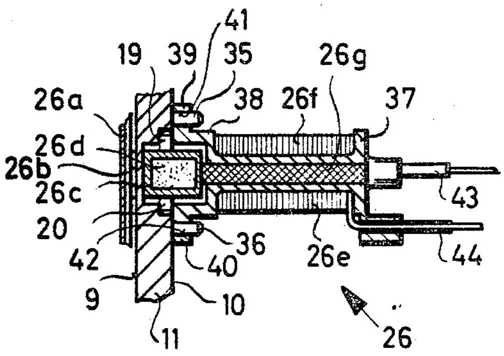
FIG. 4 illustrates a partial cut through the arrangement of an electromagnet with a flap element in its built-in state.
Figure 4A:
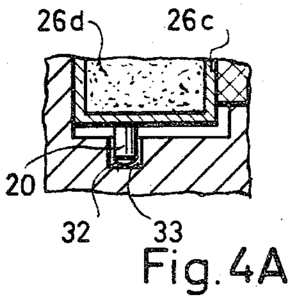
FIG. 4A shows a detailed view of the mounting arrangement of the flap element in the housing.

In the example shown in FIG. 2 for indicating the figure "3", it is shown how, by partially covering or uncovering the contour 9, the figures are formed. When the figure "3" is to be indicated, the flap elements 25 and 26 are moved to the covering position while, simultaneously, the remaining five flap elements 21, 22, 23, 24 and 27 are moved to the uncovering position. Each flap elements 21 to 27 consists essentially of a cylindrical-shaped segment such as *26a* in FIGS. 4 or 4A which, by means of a bridge *26b*, is connected to a pocket *26c* into which a small permanent magnet *26d* may be inserted. The segment *26a* of the corresponding flap elements is of such shape and arrangement that at the corners of the "8"-shaped symbol, it is provided with diagonally running edges 34 (FIGS. 1A and 2) so that, for covering and uncovering of parts of the figure forming contour 9, an optimal representation may be achieved.

The best possible representation, and thereby also readability of a figure to be shown also in the range of the median bar 27/1 of the figure forming contour 9, is to be achieved by a method which leads to a complete representation of the figure to be indicated. This measure may be seen in that on the left hand side in the figure representations according to FIGS. 1 to 6 from top to bottom, the flap elements 26, 25 are interrupted in line with the lower edge 27/2 of the median bar 27/1 of contour 9 while on the right side, the flap elements 22, 23, running from top to bottom, are cut in line with the upper edge 27/3 of the median bar 27/1 of contour 9. This functionally means that when, for forming the figure representation, the flap element 23 or the flap element 26 are moved to the uncovering position to show the contour 9 thereunder while the flap elements 22 and 27 in line therewith are kept in their covering position so that parts of the contour 9 remain covered, the transition between the median bar 27/1 and the vertically running bar of contour 9 are kept in an uninterrupted line. This means that the figure symbol or the bar width is not detrimentally influenced by any cut away or cut in portions. With a view to an aesthetic appearance and thereby also to readability, an almost perfect representation of the figure is achievable. An optimal effect is achieved when the edges 22*h* and 25*h* of the flap elements 22 or 25 are in line with the upper 27/3 or lower 27/2 edge of the median bar 27/1. Due to the mounting of all flap elements 21 to 27 as described in the following, it is possible to mount the flap elements 21 to 27 in an axial direction almost without any tolerances and without special securing means. This means, furthermore, that the flap elements 21 to 27 are unmovable in axial direction and also that the air gap at the transition between the individual flap elements can be kept within very small limits.

Axially parallel to the cylinder-shaped segment, a, at the side walls of the pocket, c, there are carrying bolts 19, 20 arranged which are one piece with the whole flap elements 21 to 27, which bolts have rounded ends 32. As may also be taken from FIGS. 3, 4, 4A, 5 and 6, the grooves 12 to 18 in the contour 10 on the back side of plate 11 are provided at their forward ends with plane stop surfaces 33. Since the flap elements 21 to 27 must be mounted with as little friction as possible, the stop surfaces 33 in connection with the rounded ends 32 on the bearing bolts 19, 20 allow for a mounting of the flap elements 21 to 27 without any special axial securing elements and without any tolerances and with very little friction.

Figure 3:
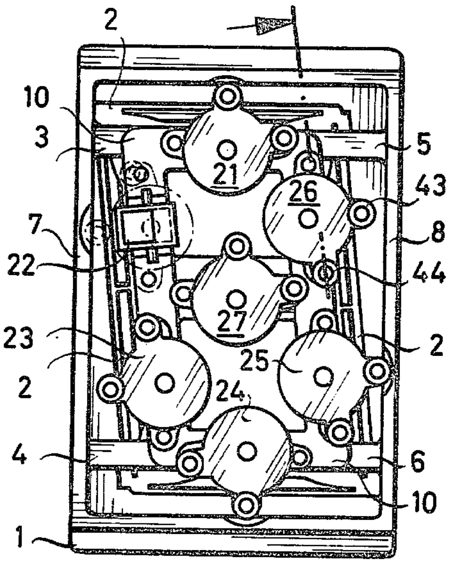
FIG. 3 is a reverse view of the digital indicating device with one electromagnet taken away.
Figure 2D:
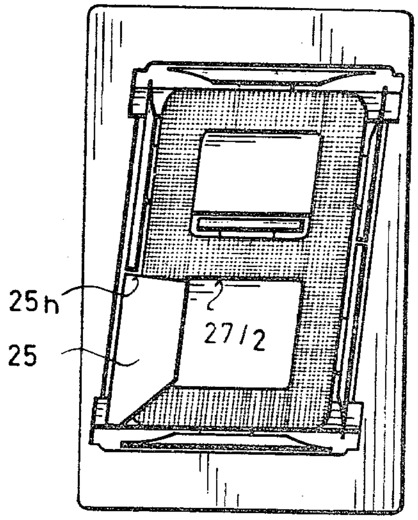
Figure 5:
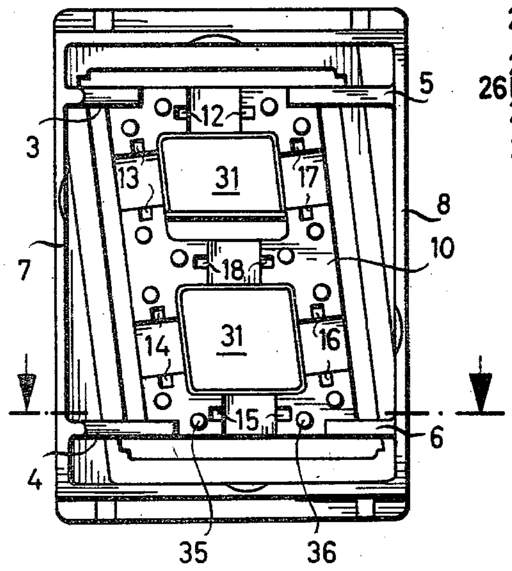
FIG. 5 illustrates a reverse view of the one-part housing for the digital indicating device (without magnets and flap elements)

The complete flap elements 21 to 27, as may be seen from FIGS. 3 and 5, are insertable from the reverse side into the grooves 12 to 18 of the housing 1. At the bar-shaped contour 10 on the reverse side and projecting above the grooves 12 to 18 for arranging the flap elements 21 to 27, there are taking up bolts 35, 37 (FIG. 4) provided for in the housing 1 on which the corresponding electromagnets, such as 26*e* for driving the flap elements 21 to 27, may be pressed on in correct position. Another fastening element for the electromagnets is not required. As is known, the electromagnetic driving circuit consists of a coil, f, and an iron core, g, by means of which the current flow in the coil f is energized (see, e.g. 26*f* and 26*g* in FIG. 4). Depending on the direction and strength of the current through the windings of the coil f, the iron core g is magnetized so that a north pole or a south pole is produced at the end opposite the flap elements 21 to 27. Correspondingly, when a north pole is produced at the effective end of the electromagnet e or at the correspondingly poled iron core g, that part of the permanent magnet d in the pivotally mounted pocket c of the flap element 26 is attracted which has a south pole simultaneously repell the north pole end of the permanent magnet d. When, by an alteration of the direction of the current flow in the electromagnet e (e.g. 26*e* in FIG. 4), the iron core g is reversed in its polarity, a south pole is also produced at the end so that the flap element 26 is controlled to attain its reverse angular position. The two angular end positions of each flap elements 21 to 27 are given by the pocket c being mechanically arrested in the two pivotal directions at the internal edge of the contour 10 of the housing 1 as may be seen from FIG. 7.

Due to using a magnetically "medium-hard" material for moving the flap elements 21 to 27 from one angular position to the other, only current pulses of relatively short duration are required. The residual magnetism which is built up in the iron core g produces, independently of the duration of the current pulse in the coil, the necessary driving torque to move the flap elements 21 to 27 to the other angular position and is simultaneously a precondition for keeping the segment in its stable end position.

The design of the electromagnet e for controlling the seven flap elements 21 to 27 comprises the same coil body 37 for all seven driving circuits. As may be seen from FIG. 4, the coil body 37 is provided with a U-shaped profile 38 in the direction of the coil axes with flange-like projecting lugs 39, 40. In the lugs 39, 40, there are take-up bores 41, 42 having a distance from each other corresponding to the distance of the take-up bolts 35, 36 at the reverse side of plate 11 in housing 1. By pressing the coil body 37 onto the take-up bolts 35, 36, the electromagnet e can be fastened without using any additional parts and is simultaneously brought to a magnetically optimally efficient position to the rotatably mounted flap elements 21 to 27. Apart from that, the lugs 39, 40 secure in position the mounting bolts 19, 20 in the grooves 12 to 18. Due to the construction of the coil body 37, the magnet pocket c of the flap elements 21 to 27 is mounted without friction between the shanks of the U-shaped profile 38. The lugs 39, 40 cover the bearings with the bearing bolts 19, 20 completely so that complete protection against dirt results.

Since the complete digital indicating device essentially consists of only three different parts, manufacture and, especially, mounting can be effected with the least possible expense. Mounting a complete digital indicating device means that into the one part housing 1, including the "8"-shaped contour 9, 10 as basis for the figure representation, the seven flap elements 21 to 27 are loosely inserted from the reverse side into the grooves 12 to 18. Thereafter, for each flap elements 21 to 27, the related electromagnet 21*e* to 27*e* is pressed with its coil body 37 onto the take up bolts 35, 37 in the housing 1. For connecting the coils 21*f*-27*f* to the current leads, of course, corresponding connection must be provided to connect the leads. In the embodiment according to FIGS. 4 and 7, for each coil, e.g. 26*f*, two tube-shaped soldering tags 43, 44 are directly inserted in the backward flange of the coil body 37. Instead of the soldering tags 43, 44, other connecting elements, such as, for instance, pins or the like may also be used for pin connecting the digital indicating device or other corresponding connecting elements.

Thus, as described above, the indicating device advantageously consists of a single housing part which encompasses all the other parts and protects them against external influences. The housing part has a window opening at the front side in the form of a parallelogram. The lateral walls of the housing extend backwardly so that, when the electromagnets and the flap elements are inserted, they are completely surrounded by the parallelepiped-shaped housing. Simultaneously, the lateral walls serve as a bearing part at which, by means of connecting rods, the freely accessible plate arranged in the window plane is supported which, however, is formed as one part with the housing.

The connecting rods are preferably arranged at the diagonally opposite corners of the plate and run vertically backward and are then connected by lateral parts to the side walls as carrier elements. This arrangement serves the purpose of keeping the space around the plate free for arranging the specially-designed flap elements especially since the plate is simultaneously the cover of the window opening and the carrier of the "8"-shaped contour so that, in itself, it is the bearing element for the figure symbols to be represented. Since the plate forms one part with the housing, it is assured that the figure symbol is always in exact position with respect to the housing. When a multiposition figure is to be indicated, the individual decades, because of stop parts prepared at the housing, can be formed as lines of indicating display means in prefabricated plates. Due to the advantageous design of the individual decades, a row of decades gives a very exact representation. This impression is still increased by the fact that the contour of the figure symbol is elevated from the plate and is covered with dye in a surface printing process.

With regard to the optical impression as well as with respect to manufacture, this arrangement is especially advantageous. It is possible to represent the figure symbols by means of a continuous line without arranging special parts. Further, the plate simultaneously serves to cover and to mount the movable flap elements. In the bar-shaped contour at the back side of the plate, grooves are provided in which the flap elements are pivotally insertable by means of their bearing bolts. The grooves are provided at their forward ends with limiting surfaces so that no special axial stop elements for the flaps are required.

To achieve a mounting of the flap element which is, as much as possible, free from friction, the bearing bolts are rounded off at their ends. Accordingly, for actually securing them, there are no losses by friction. Also, forming a part of the housing, at the bar-shaped contour at the reverse side of the plate, bolts are disposed for holding the electromagnets in correct position to the flap elements so that these may be fastened without special parts. The arrangement also makes certain an optimal position of the electromagnetic field with respect to the permanent magnet core of the flap elements since the air gap between the permanent magnet and the core of the electromagnet can be kept very small. This means that there are very small magnetic losses so that the flap elements connected with the permanent magnets can be moved to their angular end positions by relatively weak current pulses. The rotation of the flap to one or the other end position is effected by reversing the poling of the magnetizable core in the coil due to the alternating direction of the current pulse in the coil. The coil core consists of a magnetizable medium-hard magnetic material which, due to the residual magnetism, keeps the flap elements with the permanent magnets in a stable, defined angular position even if there is no current pulse in the coil.

In an advantageous embodiment, the coil body is provided in the direction of the coil axis with a U-profile having flange-shaped lugs extending outwardly. In the lugs, bores are provided having such distance as the bolts on the back side of the plate. By pressing the coil body onto the bolts, the electromagnet is fastened and simultaneously brought to the magnetically optimal position. In addition thereto, when the lugs are inserted, they contribute to the fastening of the bearing bolts of the flap elements in corresponding grooves. Due to the design of the coil body, the magnet within the flap element moves practically without friction between the U-shaped shanks of the coil body with the lugs covering the bearings of the bearing bolts so completely that there is also an effective protection of the bearings of the flap elements against dirt and against increased friction resulting therefrom.

The design of certain details such as the housing, the flap element and the coil body reduces the expense in part practically to three main parts and thereby reduces the expense for mounting the digital indicating device to a minimum. It is only necessary to insert into the one-part housing, including the "8"-shaped contour for the representation of the figure symbols, the seven flap elements from the back. Thereafter, the electromagnets are inserted which, because of their special design, are pressed with their coil bodies onto the bolts provided therefor in the housing. The parts are in an optimal functional relationship to each other by this arrangement. There is no special fastening device for the electromagnets and also no special part for limiting the pivotal movement of the flap elements. The bearings of the movable parts are in a protected position and covered against any dirt.

In an advantageous manner, the vertically running flap elements are of varying length; the transition between the individual flap elements being in the range which, with respect to the presentation of the figure, lends the figure to be indicated an optimal design. Since the base figure is the "8" in the form of a parallelogram with a median bar, the transition line is arranged within the vertically running flap elements on the right side in line with the upper edge of the median bar and correspondingly for the flap elements on the left hand side in line with the lower edge of the median bar. Accordingly, in no position, when the figure is covered, is there anything cut-away. The asymmetric arrangement of the vertically running flap elements means that, especially for such figures which have a median bar, there is an essential improvement of the outward appearance and of the readability of this figure. With the exception of the figure "2", all figures "0" to "9" are formed by a continuous line over the whole width of the bar of the base figure. The compromise for the figure "2" in which the median bar is shown as an individual segment was unavoidable due to the structure of the figure "2", but this compromise can be made when, on the other hand, all the other figures may be represented in their optimally possible shape.

While the foregoing description and drawings represent the preferred embodiments of the present invention, it will be obvious to those skilled in the art that various changes and modifications may be made therein without departing from the true spirit and scope of the present invention.

What is claimed is:

1. An electromechanically driven digital indicating device comprising:

a deep drawn parallelopiped housing having a front window opening in the shape of a parallelogram, said housing having internal side walls and bearing a plate with an elevated, freely accessible, bar-formed, "8"-shaped contour, said plate being constructed integral with the housing with a space between and plate and said housing, said housing including connecting rods and wherein said plate is supported only at said connecting rods at the rear of said internal side walls;

an arrangement of seven flap elements for movement between two defined positions, said flap elements representing, at one plane of said housing, in composite, an "8" shape, said flap elements being disposed on said housing and cooperating with said contour;

electromechanical means for controlling movement of the flap elements so that when combinations of certain of the flap elements are actuated thereby, representations of digits are shown; and wherein, at the reverse side of the elevated contour, grooves are disposed, into which said flap elements are pivotally insertable, and wherein bearing bolts are employed to support said flap elements.

2. A digital indicating device according to claim 1, wherein the "8"-shaped elevated contour is covered with a layer of dye in a surface printing process so that all digits to be indicated are represented by a continuous line on the basis of the elevated contour.

3. A digital indicating device according to claim 1, wherein the bearing bolts have rounded ends and wherein the grooves have stop surfaces at their forward ends which, in connection with said rounded ends of the bearing bolts, allow for the flaps to be mounted free of tolerances and with little friction.

4. A digital indicating device according to claim 1, wherein at the bar-shaped contour on the reverse side as part of the housing there are at least two bearing bolts for fastening for each flap element upon which an electromagnet is fixable at a correct position to drive the flap elements.

5. A digital indicating device according to claim 1, wherein the flap elements covering the "8"-shaped contour are provided at the corners of the "8"-shaped contour with diagonally running cut-offs and wherein the flap elements which run on the left side from top to bottom are cut-off parallel to the lower edge of a median bar of the contour while, at the right side, the flap elements running from top to bottom are cut-off in line with the upper edge of the median bar of the contour.

6. An electromechanically driven digital indicating device comprising:

a deep drawn parallelopiped housing having a front window opening in the shape of a parallelogram, said housing having internal side walls and bearing a plate with an elevated, freely accessible, bar-formed, "8"-shaped contour, said plate being constructed integral with the housing with a space between and plate and said housing, said housing including connecting rods and wherein said plate is supported only at said connecting rods at the rear of said internal side walls;

an arrangement of seven flap elements for movement between two defined positions, said flap elements representing, at one plane of said housing, in composite, an "8" shape, said flap elements being disposed on said housing and cooperating with said contour;

electromechanical means for controlling movement of the flap elements so that when combinations of certain of the flap elements are actuated thereby, representations of digits are shown through said space;

wherein, at the reverse side of the elevated contour, grooves are disposed, into which flap elements are pivotally insertable, and wherein bearing bolts are employed to support said flap elements;

wherein, at the bar-shaped contour on the reverse side as part of the housing, there are at least two of said bearing bolts for fastening for each said flap element upon which an electromagnet means if fixable at a correct position to drive the flap elements;

and wherein each electromagnet means has a coil body which, at its one end in the direction of the coil axis, is provided with a U-shaped profile with flange-shaped externally projecting lugs and bearing holes in the lugs the coil body of the electromagnet means being fastened to the bearing bolts at the reverse side of the bar-shaped contour so as to secure the bearing bolts of the flap elements in the grooves.

* * * * *